(12) United States Patent
Anzai (10) Patent No.: US 7,334,292 B2
(45) Date of Patent: Feb. 26, 2008

(54) HINGE DEVICE (75) Inventor: Tadashi Anzai, Hino (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 149 days.

(21) Appl. No.: 10/530,924

(22) PCT Filed: Oct. 17, 2003

(86) PCT No.: PCT/JP03/13342

§ 371 (c)(1),
(2), (4) Date: Apr. 8, 2005

(87) PCT Pub. No.: WO2004/038147

PCT Pub. Date: May 6, 2004

(65) Prior Publication Data

US 2006/0162125 A1 Jul. 27, 2006

(30) Foreign Application Priority Data

Oct. 23, 2002 (JP) .............................. 2002-308162

(51) Int. Cl.
E05F 3/20 (2006.01)
(52) U.S. Cl. ....................................................... 16/54
(58) Field of Classification Search .................... 16/54, 16/330, 319, 280, 285, 289, 292, 299–301, 16/307; 4/236, 234, 237, 240, 242.1
See application file for complete search history.

(56) References Cited

U.S. PATENT DOCUMENTS 1,282,588 A * 10/1918 Keene ......................... 16/256
1,701,022 A * 2/1929 Thornton ..................... 16/54
4,908,906 A * 3/1990 Hanna ......................... 16/445
4,982,453 A * 1/1991 Matsumoto .................. 4/248
5,590,440 A * 1/1997 Pelt et al. .................... 16/429
5,651,536 A * 7/1997 Daul ........................... 267/205
5,768,718 A * 6/1998 Sorimachi .................... 4/236
5,906,010 A * 5/1999 Suzuki ........................ 4/236
6,421,842 B1* 7/2002 Fujita ......................... 4/236

FOREIGN PATENT DOCUMENTS

DE 2214676 8/1974
DE 10020180 A1 * 10/2001

(Continued)

OTHER PUBLICATIONS

Patent Abstracts of Japan issued in Japanese Publication No. 01198983 dated Aug. 10, 1989 (1 page).

(Continued)

Primary Examiner—Chuck Y. Mah
(74) Attorney, Agent, or Firm—Osha Liang LLP (57) ABSTRACT A connecting cylindrical part of a second hinge member is inserted between first and second support arm parts of a first hinge member such that an axis of the second hinge member is aligned with that of a rotation axis. A hinge cylinder is passed through the connecting cylindrical part. The hinge cylinder is non-turnably fitted to opposite end parts of the connecting cylindrical part. The opposite end parts of the hinge cylinder projecting from the connecting cylindrical part are turnably fitted to the first and second support arm parts through bearings, respectively.

6 Claims, 5 Drawing Sheets

FOREIGN PATENT DOCUMENTS

| | | | | |
|---|---|---|---|---|
| GB | 2420587 | A | * | 5/2006 |
| JP | 1198983 | | | 8/1989 |
| JP | H07-286472 | A | | 10/1995 |
| JP | 08184254 | A | * | 7/1996 |
| JP | H09-184354 | A | | 7/1996 |
| JP | 3039413 | U | | 4/1997 |
| JP | 2000136669 | A | * | 5/2000 |

OTHER PUBLICATIONS

Supplementary European Search Report issued in European Application No. 03756694 dated Aug. 6, 2007 (3 pages).

* cited by examiner

HINGE DEVICE

TECHNICAL FIELD

This invention relates to a hinge device and more particularly to a hinge device suited to be used for a heavy-weighted large-sized door and the like.

BACKGROUND ART

In general, there are two types of hinge devices. In the first type, respective one end parts of the first and second hinge members are turnably connected to each other, and in the second type, support arm parts are formed on opposite end parts of the first hinge member, respectively and opposite end parts of a second hinge member are turnably connected to the support arm parts, respectively. In the former hinge device, the first and second hinge members are connected to each other in a cantilever fashion, and in the latter hinge device, the second hinge member is connected to the first hinge member in a two-spot supporting fashion. Accordingly, the latter hinge device is suited to be used for a heavy-weighted door and the like. The present invention relates to the latter hinge device.

In the conventional two-spot supporting hinge device, the respective support arm parts of the first hinge member attached to the skeleton, and the opposite end parts of the second hinge member attached to the door are turnably connected to each other through a damper unit. This damper unit prohibits the door from turning at a high speed at the time the door turns at least in one direction of opening and closing directions, for example, closing direction. This is intended to prevent an unexpected accident which is likely to occur when a large-sized door turns at a high speed (for example, see Official Gazette, page 6 to 7 and FIG. 3 of Registered Japanese Utility Model No. 3,039,413).

In the above-mentioned conventional two-spot supporting type hinge device, a stator and a rotor constituting the damper unit are fitted to a support arm part of the first hinge member and an end part of the second hinge member, respectively, thereby turnably connecting the first and second hinge members. However, the number of the places for turnably fitting the first and second hinge members to each other becomes large in such a connecting construction as mentioned above, because the stator and the rotor are turnably fitted to each other and the stator and the rotor are fitted to the support arm part and the second hinge member, respectively. Therefore, there is such a problem that play tends to occur between the first hinge member and the second hinge member. Moreover, since the damper unit is comparatively low in rigidity, the conventional two-spot supporting hinge device has such a disadvantage as to lack strength when it is used for a heavy-weighted, large-sized door.

DISCLOSURE OF THE INVENTION

The present invention has been accomplished in order to solve the above-mentioned problem. According to the present invention, there is provided a hinge device comprising a first hinge member which is provided at one and the other end part thereof with mutually opposing first and second support arm parts, a second hinge member provided with a connecting cylindrical part which is disposed between the first and second support arm parts in such a manner as to be turnable about a rotation axis, and a damper unit including a stator, a rotor one end part of which is turnably received in the stator and the other end part of which is projected from the stator and a damper mechanism disposed between the stator and one end part of the rotor, high-speed turn at least in one direction between the first hinge member and the second hinge member being prevented by the damper unit, wherein a support through-hole passing on the rotation axis is formed in the first support arm part, a support hole is formed in an opposing surface with respect to the first support arm part of the second support arm part with an axis thereof aligned with that of the support through-hole, a front end part of a hinge pin inserted in the support through-hole through an outer opening part thereof and passing through the connecting cylindrical part is fitted to the support hole, a rear end part of the hinge pin is fitted to the support through-hole, the hinge pin is fitted to opposite end parts of the connecting cylindrical part, thereby turnably connecting the first and second support arm parts with the connecting cylindrical part through the hinge pin, at least one of the stator and the other end part of the rotor of the damper unit is non-turnably received in a receiving hole formed in at least one of a front end face and a rear end face of the hinge pin, the other of the stator and the other end part of the rotor is non-turnably received in one of the support through-hole and the support hole to which one end part of the hinge pin, where the receiving hole is formed therein, is fitted, and a coiled spring for turn biasing the connecting cylindrical part with respect to one of the first support arm part and the second support arm part is disposed between an inner peripheral surface of the connecting cylindrical part and an outer peripheral surface of the hinge pin.

It is accepted that the stator is non-turnably received in the receiving hole and the other end part of the rotor is non-turnably received in one of the support through-hole and the support hole to which one end part of the hinge pin, where the receiving hole is formed, is fitted. It is also accepted that the receiving hole is formed in a rear end face of the hinge pin, a connecting plate is detachably fixed to the inside of the support through-hole, the other end part of the rotor is non-turnably fitted to an engagement hole formed in the connecting plate, thereby the other end part of the rotor is non-turnably received in the support through-hole. It is also accepted that the receiving hole is formed in each of opposite end faces of the hinge pin, the stator of the damper unit is non-turnably received in each of the receiving holes, and the other end parts of the rotors of the damper units are non-turnably received in the support through-hole and the support hole, respectively.

It is accepted that the support hole is formed as a through-hole, the connecting plates are detachably fixed to the insides of the support through-hole and the support hole, and the other end parts of the rotors are non-turnably fitted to engagement holes formed in the respective connecting plates, thereby the other end parts of the respective rotors are non-turnably received in the support through-hole and the support hole, respectively.

It is also accepted that the receiving hole is formed as a through-hole, an intermediate member is non-turnably disposed at a central part of the receiving hole, the stators are received in opposite end parts of the receiving hole, respectively, and the stators are non-turnably connected to the intermediate member

BEST MODE FOR CARRYING OUT THE INVENTION

One preferred embodiment of the present invention will be described hereinafter with reference to FIGS. 1 through 11.

Figure 1:
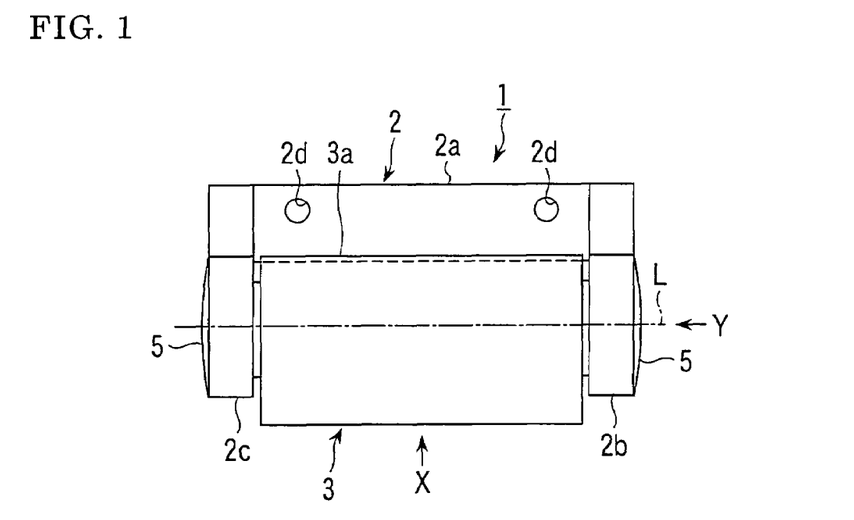
FIG. 1 is a plan view showing one embodiment of the present invention, in which a second hinge member is located in a closed position.
Figure 2:
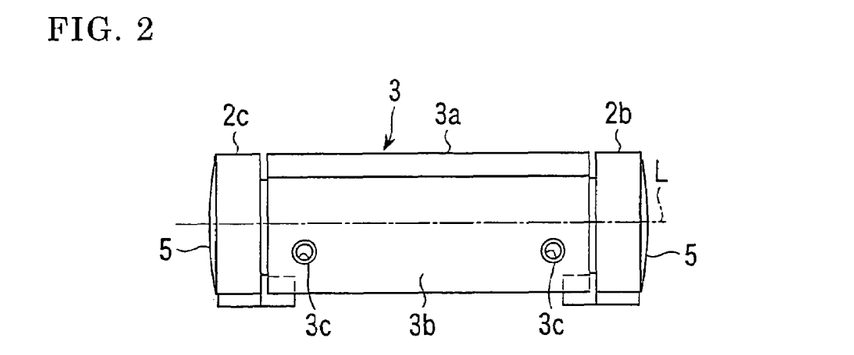
FIG. 2 is a view, when viewed in a direction as indicated by an arrow X in FIG. 1.
Figure 3:
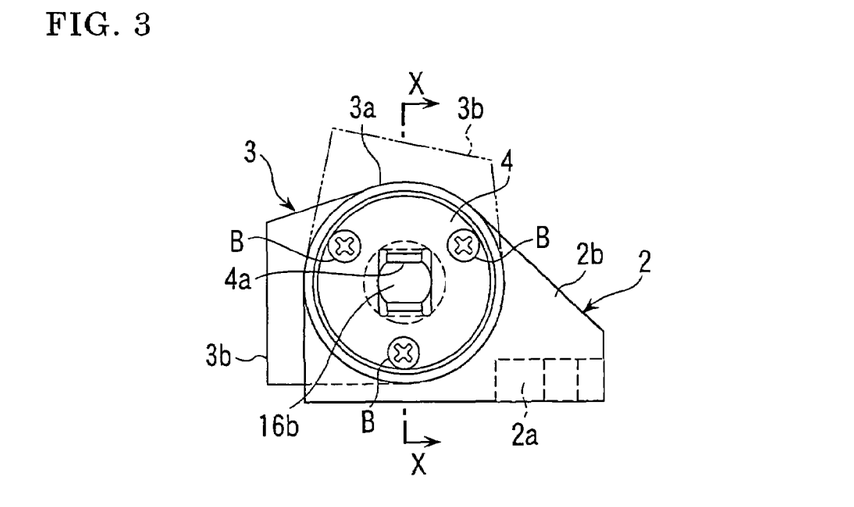
FIG. 3 is a view, when viewed in a direction as indicated by an arrow Y in FIG. 1 but in which a cosmetic cover is not shown.

As shown in FIGS. 1 through 3, a hinge device 1 comprises first and second hinge members 2, 3. The first hinge member 2 includes an attachment plate part 2a and first and second support arm parts 2b, 2c integrally formed on opposite end parts in the longitudinal direction of the attachment plate part 2a. Bolt passage holes 2d are formed in the attachment plate part 2a. Bolts (not shown) passing through the bolt passage holes 2d are threadingly engaged with selected one of a door frame and a door and then tighten. By doing so, the first hinge member 2 is attached to the selected one of the door frame or door. The first and second support arm parts 2b, 2c are projected in the direction orthogonal to the longitudinal direction of the attachment plate part 2a.

Figure 4:
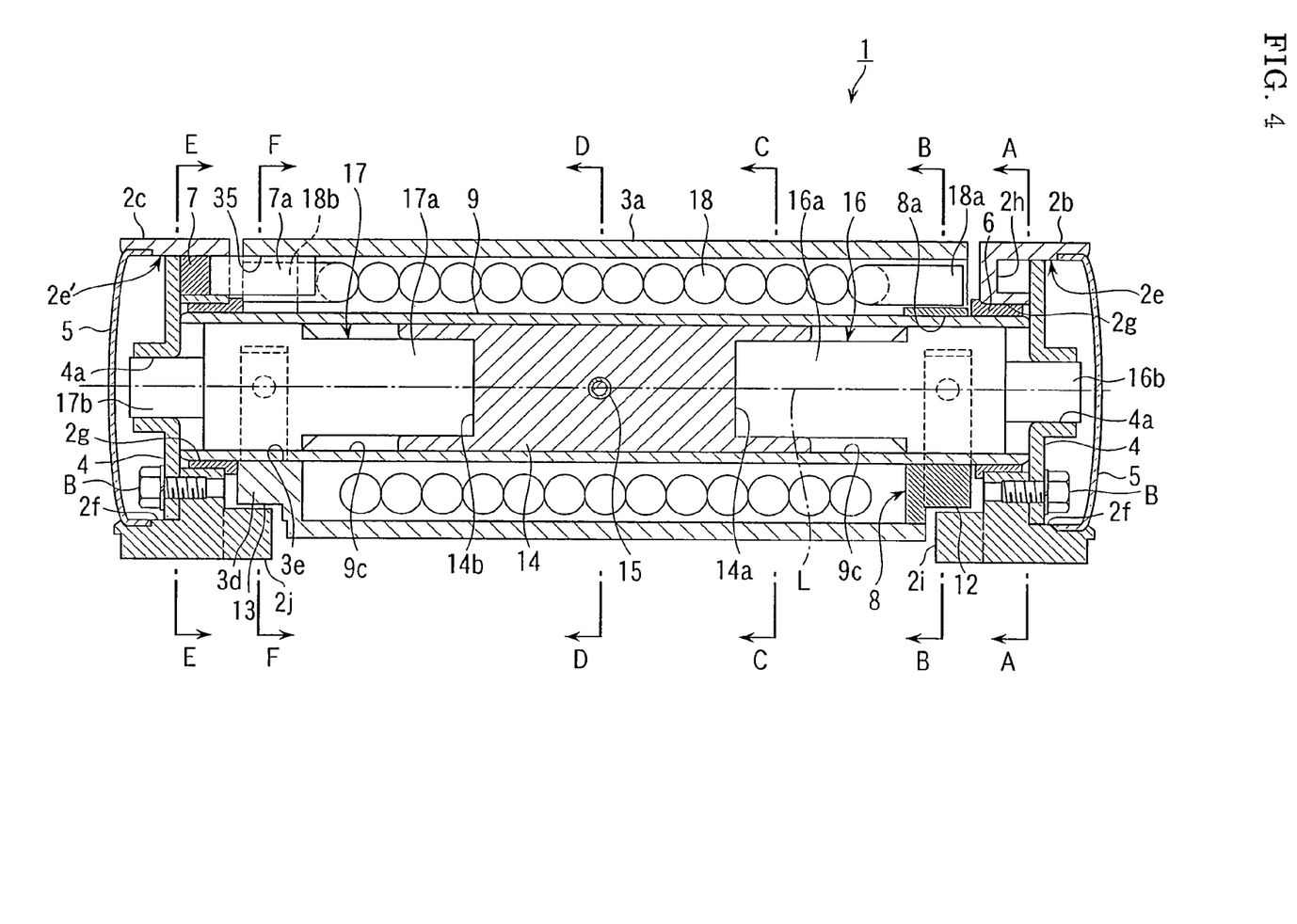
FIG. 4 is an enlarged sectional view taken on line X-X in FIG. 3.
Figure 5:
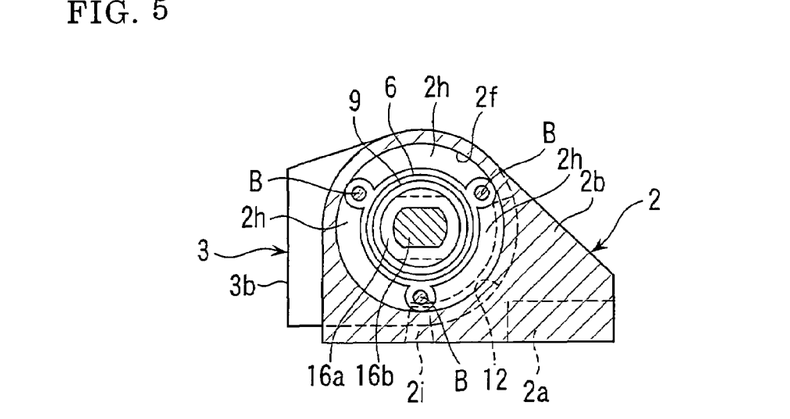
FIG. 5 is a sectional view taken on line A-A in FIG. 4.

As shown in FIG. 4, a support through-hole 2e passing through the first support arm part 2b on a rotation axis L is formed in the first support arm part 2b. This support through-hole 2e comprises an outer side (right side in FIG. 4) enlarged-diameter hole part 2f and an inner side reduced-diameter hole part 2g. A plurality (three in this embodiment) of recesses 2h extending in the peripheral direction of the enlarged-diameter hole part 2f are formed in a bottom surface of the enlarged-diameter hole part 2f at suitable intervals in the peripheral direction. A disc-like connecting plate 4 having an outside diameter generally equal to the inside diameter of the enlarged-diameter hole part 2f is inserted in the bottom part side of the enlarged-diameter hole part 2f. This connecting plate 4 is pressed and fixed to the bottom surface of the enlarged-diameter hole part 2f through bolts B which are penetrated through the connecting plate 4. An engagement hole 4a is formed in a central part of the connecting plate 4. This engagement hole 4a is formed as an elongate hole whose opposing side parts in the inner peripheral surface of the engagement hole 4a are each formed as a planar surface. The engagement hole 4a may take any other shape as long as the shape is not circular. A cosmetic cover 5 is fitted and fixed to an opening part of the enlarged-diameter hole part 2f. A circular cylindrical bearing 6 is fitted to the inner peripheral surface of the reduced-diameter hole part 2g.

A support passage hole (support hole) 2e comprising an enlarged diameter hole part 2f and a reduced-diameter hole part 2g and a recess 2h are also formed in the second support arm part 2c, a connecting plate 4 having an engagement hole 4a is fixed to the bottom surface of the enlarged-diameter hole part 2f through bolts B, a cosmetic cover 5 is fitted and fixed to the opening part of the enlarged-diameter hole part 2f, and a bearing 6 is disposed at the inner peripheral surface of the reduced-diameter hole part 2g. Those arrangements are same as in the first support arm part 2b. However, the support through-hole 2e of the second support arm part 2c is referred to as the support hole in order to be distinguished from the support through-hole 2e of the first support arm part 2b and denoted by reference numeral 2e'. The second support arm part 2c further includes the following arrangements. That is, a receiving member 7 is inserted and fixed to one of the recesses 2b formed in the second support arm part 2c and prevented from escaping from the recess 2h by the connecting plate 4. A projection part 7a penetrating the second support arm part 2c from the bottom surface of the recess 2h toward the first support arm part 2b along the rotation axis L is formed in the receiving member 7.

Instead of the support hole 2e' formed in the second support arm part 2c, a blind hole (support hole) whose outer end part is closed may be employed. In case the blind hole is employed instead of the receiving hole 2e', a blind hole (support hole) corresponding to the reduced-diameter hole part 2g is formed in the inner end face (end face opposing the first support arm part 2b) of the second support arm part 2c. An engagement hole corresponding to the engagement hole 4a is formed in the bottom surface of this blind hole. A recess extending in the peripheral direction is formed in the inner end face of the second support arm part 2c, and the receiving member 7 is inserted and fixed to this recess. The receiving member 7 may be inserted and fixed to the recesses 2e formed in the support through-hole 2e of the first support arm part 2b.

The second hinge member 3 includes a connecting cylindrical part 3a having a circular shape in section. This connecting cylindrical part 3a has a length generally equal to the distance between the first and second support arm parts 2b, 2c. The connecting cylindrical part 3a is inserted between the first and second support arm parts 3a with opposite end faces thereof opposed to the first and second support arm parts 2b, 2c. Moreover, the connecting cylindrical part 3a is arranged with its axis aligned with the rotation axis L. The connecting cylindrical part 3a is, as later described, connected to the first and second support arm parts 2b, 2c in such a manner as to be turnable about the rotation axis L. The turning range of the connecting cylindrical part 3a, i.e., the turning range of the second hinge member 3 is restricted to a predetermined angle range, as later described. In this embodiment, the turning range of the connecting cylindrical part 3a is set to 100 degrees. An attachment part 3b extending from one end to the other end of the connecting cylindrical part 3a is formed at one side part of the outer peripheral surface of the connecting cylindrical part 3a. Threaded holes 3c are formed in a planar side surface of the attachment part 3b. Bolts (not shown) passing through the other one of the door and the door frame are threadingly engaged with the threaded holes 3c and tightened. By doing so, the second hinge member 3 is attached to the other one of the door and the door frame. When the second hinge member 3 is turned to one limit position within the predetermined angle range with respect to the first hinge member 2, the door is brought to the closed position, and when the second hinge member 3 is turned to the other limit position within the predetermined angle range with respect to the first hinge member 2, the door is brought to the open position. In FIG. 3, the second hinge member 3 at the time the door when is located at the closed position is indicated by a solid line, and the second hinge member 3 at the time the door when is located at the open position is indicated by an imaginary line.

Figure 6:
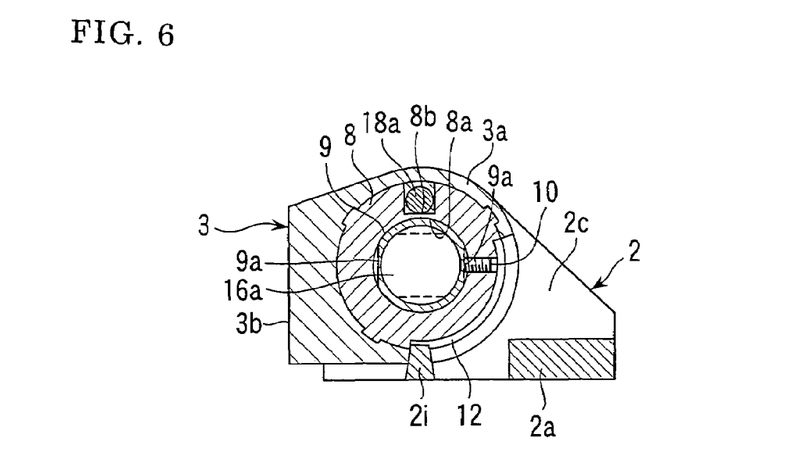
FIG. 6 is a sectional view taken on line B-B in FIG. 4.
Figure 7:
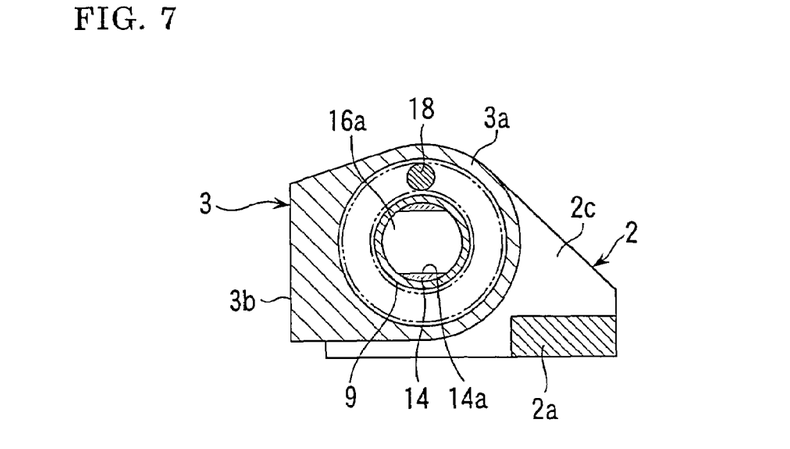
FIG. 7 is a sectional view taken on line C-C in FIG. 4.
Figure 8:
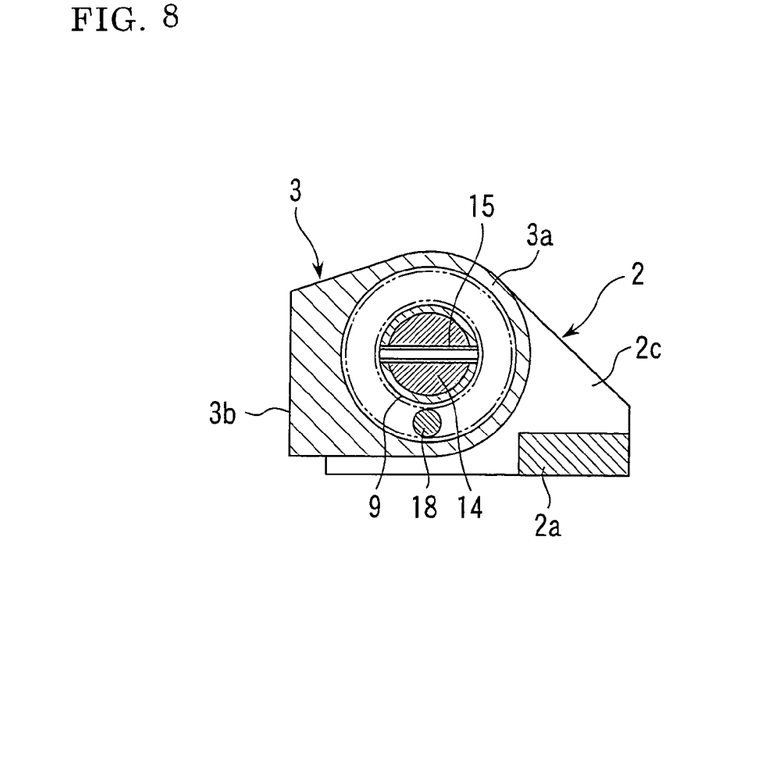
FIG. 8 is a sectional view taken on line D-D in FIG. 4.
Figure 9:
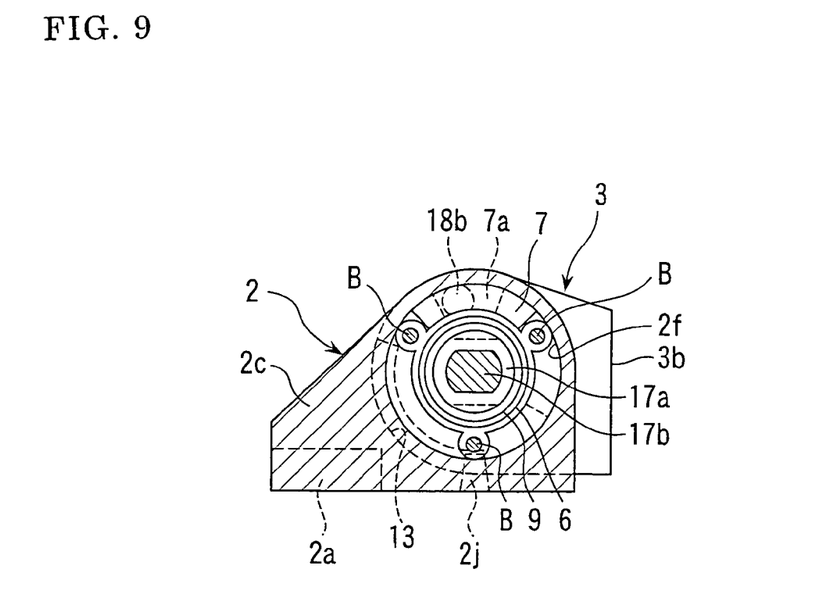
FIG. 9 is a sectional view taken on line E-E in FIG. 4.
Figure 10:
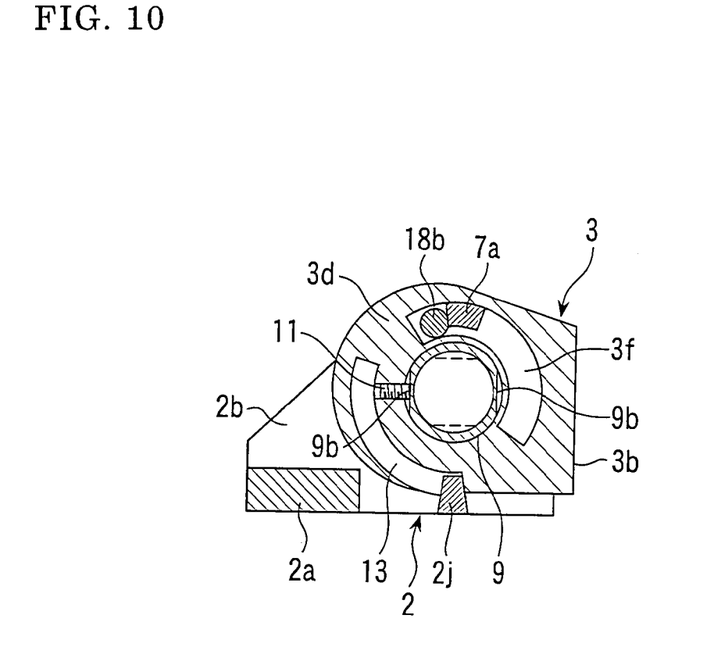
FIG. 10 is a sectional view taken on line F-F in FIG. 4.

As shown in FIGS. 4 and 6, a disc-like cover member 8 is fitted and fixed to the opening part on the first support arm part 2b side of the connecting cylindrical part 3a. A through-hole 8a having an inside diameter equal to the inside diameter of the bearing 6 is formed in the central part of the cover member 8. A bottom part 3d is formed at the end part on the second support arm part 2c side of the connecting cylindrical part 3a. A through-hole having an inside diameter equal to the inside diameter of the bearing 6 is formed in the central part of this bottom part 3d. As shown in FIG. 10, an elongate hole 3f extending in the peripheral direction is formed in the outer periphery side of the bottom part 3d. A projection part 7a of a receiving part 7a is inserted in this elongate hole 3f in such a manner as to be movable in the longitudinal direction of the elongate hole 3f, i.e., in the peripheral direction.

A hinge cylinder (hinge pin) 9 passing through the connecting cylindrical part 3a is fitted to the through-hole 8a of the cover member 8 and the through-hole 3e of the bottom part 3d. As shown in FIGS. 6 and 10, Planar surface parts 9a, 9b are formed at least on one side part of two side parts (opposite side parts separated by 180 degrees in the peripheral direction in this embodiment) of the outer peripheral surface fitted to the through-holes 8a, 3e of the hinge cylinder 9. A fixing screw 10 threadingly engaged with the through-hole 8a from the outer peripheral surface of the cover member 8 toward the inner peripheral surface of the through-hole 8a is pressed against the planar surface part 9a, and a fixing screw 11 threadingly engaged with the through-hole 3e from the outer peripheral surface of the bottom part 3d of the connecting cylindrical part 3a toward the inner peripheral surface of the through-hole 3e is pressed against the planar surface part 9b. By this, the hinge cylinder 9 is fixed to the connecting cylindrical part 3a. The length of the hinge cylinder 9 is set to be longer than that of the connecting cylindrical part 3a but generally equal to the distance between the opposing surfaces of the connecting plates 4, 4. Accordingly, Opposite end faces of the hinge cylinder 9 are projected externally from the connecting cylindrical part 3a and generally contacted with the opposing surfaces of the connecting plates 4, 4. By this, the hinge cylinder 9 is almost non-movable in the direction of the rotation axis L. One end part (front end part) of the hinge cylinder externally projecting from the connecting cylindrical part 3a after passing through the through-hole 3e of the bottom part 3d is turnably fitted to the reduced-diameter hole part 2g of the second support arm part 2c through the bearing 6. The other end part (rear end part) of the hinge cylinder 9 externally projecting from the connecting cylindrical part 3a after passing through the through-hole 8a of the cover member 8 is turnably fitted to the reduced-diameter hole part 2g of the first support arm part 2b through the bearing 6. As a result, the opposite end parts of the connecting cylindrical part 3a are turnably supported by the first and second support arm parts 2b, 2c through the hinge cylinder 9, and thus, the second hinge member 3 is turnably supported in a two-spot supporting fashion by the first hinge member 2.

As shown in FIGS. 4 and 6, a turn restricting groove 12 extending in the peripheral direction is formed in the connecting cylindrical part 3a and an end part on the first support arm part 2b side of the cover member 8. A restricting projection 2i formed on the inner end face of the first support arm part 2b is inserted in this turn restricting groove 12. When the second hinge member 3 is turned to the closed position with respect to the first hinge member 2, this restricting projection 2i is abutted with one end face in the peripheral direction of the turn restricting groove 12, and when the second hinge member 3 is turned to the closed position with respect to the first hinge member 2, the restricting projection 2i is abutted with the other end face in the peripheral direction of the turn restricting groove 12. In other words, the restricting projection 2i is abutted with one end face of the turn restricting groove 12 thereby determining the closed position of the second hinge member 3, and the restricting projection 2i is abutted with the other end face of the turn restricting groove 12 thereby determining the open position of the second hinge member 3. Of course, the turning range of the second hinge member 3 with respect to the first hinge member 2 is restricted by the restricting projection 2i and the turn restricting groove 12.

Figure 11:
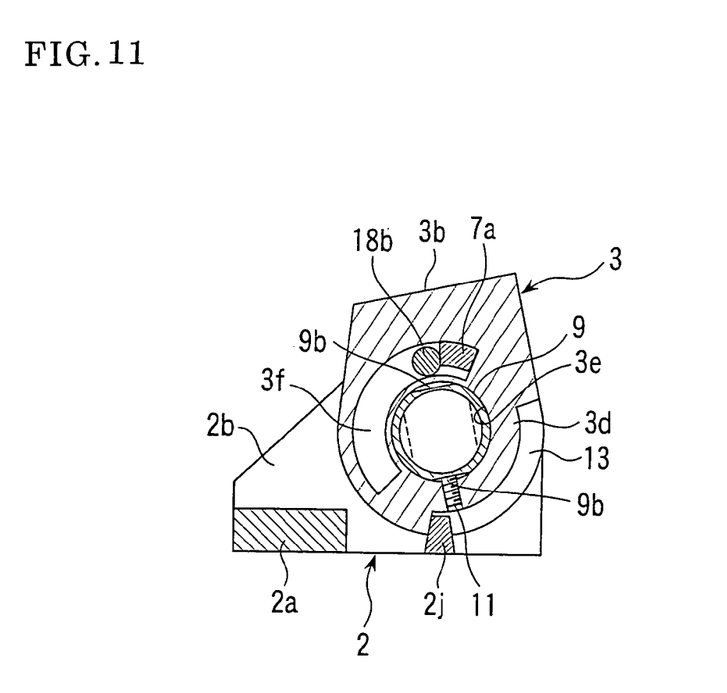
FIG. 11 is a sectional view, like FIG. 10, but in which the second hinge member is located in an open position.

As shown in FIGS. 4, 10 and 11, a turn restricting groove 13 extending in the peripheral direction is formed in an end part on the second support arm part 2c side of the connecting cylindrical part 3a, and a restricting projection 2j is formed on the second support arm part 2c. The relation between the turn restricting groove 13 and the restricting projection 2j is similar to the relation between the turn restricting groove 12 and the restricting projection 2i. That is, when the second hinge member 3 is turned to the closed position, the restricting projection 2j is abutted with one end face in the peripheral direction of the turn restricting groove 13, and when the second hinge member 3 is turned to the open position, the restricting projection 2j is abutted with the other end face of the turn restricting groove 13. The turn restricting groove 12 and the restricting projection 2i, and the turn restricting groove 13 and the restricting projection 2j are adapted in order to achieve such a same object as to restrict the turning range with respect to the first hinge member 2 of the second hinge member 3. Therefore, it is not necessarily required to employ two of them, but only one of them may be good enough.

The inside of the hinge cylinder 9 is defined as a receiving hole 9c passing through the hinge cylinder 9 along the rotation axis L. An intermediate member 14 is inserted in the central part of the inside of the receiving hole 9c. This intermediate member 14 is fixed to the hinge cylinder 9 by a spring pin 15 which is passed through the intermediate member 14 and with opposite end parts of the intermediate member 14 fitted to the peripheral wall part of the hinge cylinder 9. Engagement recesses 14a, 14b are formed in the opposite end faces of the intermediate member 14, respectively.

A damper unit 16 is disposed between the other end part of the hinge cylinder 9 and the first support arm part 2b. The damper unit 16 includes a cylindrical stator 16a, a rotor 16b turnably fitted to one end part of this stator 16a, and a damper mechanism (not shown) disposed between the stator 16a and one end part of the rotor 16b which is turnably fitted to the stator 16a. The stator 16a is received in the end part on the first support arm part 2b side from the intermediate member 14 of the receiving hole 9c of the hinge cylinder 9. One end part of the stator 16a is non-turnably fitted to the engagement recess 14a of the intermediate member 14. By this, the stator 16a is non-turnably connected to the hinge cylinder 9, and thus, non-turnably connected to the connecting cylindrical part 3a. The other end part (right end part in FIG. 4) of the rotor 16b is projected from the stator 16a toward the first support arm part 2b side. The other end part of the rotor 16b projecting from the stator 16a is non-turnably fitted to an engagement hole 4a of the connecting plate 4. By this, the rotor 16b is non-turnably connected to the first support arm part 2*b*. Since the damper mechanism is a known damper mechanism containing a viscous fluid, detailed description thereof is omitted. With this damper mechanism installed therein, the damper unit 16 prohibits the connecting cylindrical part 3*a* from making a high speed turn and allows it to make a low speed turn when the connecting cylindrical part 3*a* is turned from the open position side toward the closed position side with respect to the first support arm part 2*b*, but the damper unit 16 allows the connecting member 3*a* to make a high-speed turn when the connecting member 3*a* is turned from the closed position side toward the open position side with respect to the first support arm part 2*b*.

A damper unit 17 having the same construction as the damper unit 16 is disposed between one end part of the hinge cylinder 9 and the second support arm part 2*c*. The stator 17*a* of the damper unit 17 is received in one end part of the receiving hole 9*c* of the hinge cylinder 9 and non-turnably fitted to the engagement recess 14*b* of the intermediate member 14. The end part of the rotor 17*b* projecting from the stator 17*a* of the damper unit 17 is non-turnably fitted to the engagement hole 4*a* of the connecting plate 4 and non-turnably connected to the second support arm part 2*c* through the connecting plate 4. A known damper mechanism (not shown) is disposed between the stator 17*a* and the rotor 17*b*. Accordingly, the damper unit 17 prohibits the connecting cylindrical part 3*a* from making a high speed turn and allows it to make a low speed turn when the connecting cylindrical part 3*a* is turned from the open position toward the closed position with respect to the second support arm part 2*c*, but the damper unit 17 allows the connecting member 3*a* to make a high-speed turn when the connecting member 3*a* is turned from the closed position toward the open position with respect to the second support arm part 2*c*.

Contrary to the case with the damper unit 16, the damper unit 17 may be designed such that the connecting member 3*a* is allowed to make a high-speed turn when the connecting member 3*a* is turned from the open position toward the closed position, but the connecting member 3*a* is prohibited from making a high-speed turn and allowed to make a low-speed turn when the connecting cylindrical part 3*a* is turned from the closed position toward the open position. The damper units 16, 17 may be designed such that the connecting cylindrical part 3*a* is prohibited from making a high-speed turn and allowed to make a low-speed turn whether the connecting cylindrical member 3*a* is turned in the normal direction or reverse direction. It is also accepted that only one of the damper units 16, 17 is employed.

As shown in FIG. 4, a coiled spring 18 is received in a cylindrical space which is defined by the inner peripheral surface of the connecting cylindrical part 3*a* and the outer peripheral surface of the hinge cylinder 9. As shown in FIG. 6, one end part 18*a* of this coiled spring 18 is inserted in the groove 8*b* of the cover member 8, so that the coiled spring 18 is locked to the cover member 8 in such a manner as to be non-movable in the peripheral direction. The other end part 18*b* of the coiled spring 18 is, as shown in FIGS. 10 and 11, inserted in the elongate hole 3*f* and abutted with the projection part 7*a* of the receiving member 7. By this, the coiled spring 8 biases the connecting cylindrical part 3*a* from the open position toward the closed position. Accordingly, the second hinge member 3 is turned from the open position toward the closed position by the biasing force of the coiled spring 18, but the turning speed of the second hinge member 3 at that time is restrained to a low speed by the damper units 16, 17.

When the connecting cylindrical part 3*a* is turned with respect to the second support arm part 2*c*, the projection part 7*a* of the receiving member 7 and the other end part 18*b* of the coiled spring 18 abutted with the projection part 7*a* are moved in the peripheral direction within the elongate hole 3*f*, but the length in the peripheral direction of the elongate hole 3*f* is set such that when the connecting cylindrical part 3*a* is turned between the closed position and the open position, the projection part 7*a* and the other end part 18*b* of the coiled spring 18 are not abutted with an end part of the elongate hole 3*f*. Accordingly, the second hinge member 3 can turn between the closed position and the open position without any problem.

The hinge device 1 thus constructed can be assembled, for example, as follows. Of course, other assembling methods may be employed. In the assembling method of this example, the coiled spring 18 is preliminarily inserted in the connecting cylindrical part 3*a* and the cover member 8 is fitted and fixed to the opening side end part of the connecting cylindrical part 3*a*. One end part 18*a* of the coiled spring 18 is preliminarily inserted in the cover member 8, and the other end part 18*b* of the coiled spring 18 is preliminarily inserted in the elongate hole 3*f*. The connecting cylindrical part 3*a* is inserted between the first and second support arm parts 2*b*, 2*c*. At that time, the restricting projections 2*i*, 2*j* are brought into the turn restricting grooves 12, 13.

Next, the hinge cylinder 9 is inserted in one 2*e* (the right side support through-hole 2*e* in FIG. 4 in this embodiment) of the two support through-holes 2*e* through the outer opening side. Then, the hinge cylinder 9 is passed through the bearing 6, the through-holes 8*a*, 3*f* and the bearing 6 in this order, and the left side end part (front end part) in FIG. 4 of the hinge cylinder 9 is fitted to the reduced-diameter hole part 2*g* of the second support arm part 2*c* through the bearing 6. Of course, the right side end part of the hinge cylinder 9 is fitted to the reduced-diameter hole part 2*g* of the first support arm part 2*b* through the bearing 6. At that time, the intermediate part 14 is preliminarily inserted and fixed to the central part of the hinge cylinder 9, the stators 16*a*, 17*a* of the damper units 16, 17 are preliminarily inserted in the opposite end parts of the receiving hole 9*c* of the hinge cylinder 9, and the respectively stators 16*a*, 17*a* are preliminarily fitted to the engagement recesses 14*a*, 14*b*. After fitted to the bearings 6, 6, the opposite end parts of the hinge cylinder 9 are fixed to the connecting cylindrical part 3*a* by the fixing screws 10, 11, respectively.

Then, the receiving member 7 is inserted in the recess 2*h* of the second support arm part 2*c*, and the other end part 18*b* of the coiled spring 18 is abutted with the projection part 7*a*. Thereafter, the connecting plates 4, 4 are fixed to the enlarged-diameter parts 2*f*, 2*f* of the first and second support arm parts 2*b*, 2*c*, respectively, and the rotors 16*b*, 17*b* of the damper units 16, 17 are fitted to the engagement holes 4*a*, respectively. Lastly, the cosmetic covers 5, 5 are fitted and fixed to the enlarged-diameter hole parts 2*f*, 2*f* of the support through-hole 2*e* and the support hole 2*e'*, respectively. By doing so, the assembling operation is finished.

In the hinge device thus constructed, the damper units 16, 17 are not correlated to the connection between the first and second support arm parts 2*b*, 2*c* and the opposite end parts of the connecting cylindrical part 3*a* at all. The damper units 16, 17 are merely correlated to restriction of high-speed rotation with respect to the first and second support arm parts 2*b*, 2*c* of the connecting cylindrical part 3*a*. The first and second support arm parts 2*b*, 2*c* and opposite end parts of the connecting cylindrical part 3*a* are turnably connected to each other through the hinge cylinder 9. The number of the fitting places for turnably connecting the first and second support arm parts 2b, 2c with the connecting cylindrical part 3a is only two. Therefore, the number of the fitting places is reduced by the portion of the fitting places between the stators 16a, 17a and the rotors 16b, 17b compared with a case wherein the conventional hinge device is used. Thus, play occurrable between the first hinge member 2 and the second hinge member 3 can be minimized. Moreover, since the first and second support arm parts 2b, 2c and the opposite end parts of the connecting cylindrical part 3a are connected to each other by the hinge cylinder 9 which is entirely integrally formed, the first and second hinge members 2, 3 can be enhanced in connecting strength. Thus, by using this hinge device 1, a heavy-weighted larger-sized door and the like can be supported.

It should be noted that the present invention is not limited to the above embodiment but that many changes and modifications can be made in accordance with necessity without departing from the gist of the present invention.

For example, in the above embodiment, a hollow hinge cylinder 9 whose opposite ends are open, is used as a hinge pin. It is also accepted that a pin member having a receiving hole at each end thereof and whose intermediate substantial part is formed as the intermediate member 14 is used as the hinge pin.

INDUSTRIAL APPLICABILITY

A hinge device according to the present invention can be utilized as a hinge device for turnably connecting a door for opening/closing an opening part of a skeleton, particularly a large-sized heavy-weighted door to the skeleton.

The invention claimed is:

1. A hinge device comprising:
a first hinge member provided at one and the other end part thereof with mutually opposing first and second support arm parts,
a second hinge member provided with a connecting cylindrical part disposed between said first and second support arm parts in such a manner as to be turnable about a rotation axis, and
a damper unit including:
a stator,
a rotor, wherein one end part of the rotor is turnably received in said stator and the other end part of the rotor is projected from said stator, and
a damper mechanism disposed between said stator and one end part of said rotor, wherein high-speed turn at least in one direction between said first hinge member and said second hinge member is prevented by said damper unit,
wherein a support through-hole passing on said rotation axis is formed in said first support arm part,
wherein a support hole is formed in an opposing surface with respect to said first support arm part of said second support arm part with an axis thereof aligned with that of said support through-hole,
wherein a front end part of a hinge pin inserted in said support through-hole through an outer opening part of said support through-hole and passing through said connecting cylindrical part is received within and adjacent to said support hole,
wherein a rear end part of said hinge pin is received within and adjacent to said support through-hole,
wherein said hinge pin is received within and adjacent to opposite end parts of said connecting cylindrical part, thereby turnably connecting said first and second support arm parts with said connecting cylindrical part through said hinge pin,
wherein at least one of said stator and the other end part of said rotor of said damper unit is non-turnably received in a receiving hole formed in at least one of a front end face and a rear end face of said hinge pin,
wherein the other of said stator and the other end part of said rotor is non-turnably received in one of said support through-hole and said support hole, to which one end part of said hinge pin, where said receiving hole is formed therein, is fitted,
wherein a coiled spring turn biases said connecting cylindrical part with respect to at least one of said first support arm part and said second support arm part, and
wherein said coiled spring is disposed between an inner peripheral surface of said connecting cylindrical part and an outer peripheral surface of said hinge pin.

2. A hinge device according to claim 1, wherein said stator is non-turnably received in said receiving hole and the other end part of said rotor is non-turnably received in one of said support through-hole and said support hole to which one end part of said hinge pin, where said receiving hole is formed, is fitted.

3. A hinge device according to claim 2, wherein said receiving hole is formed in a rear end face of said hinge pin, a connecting plate is detachably fixed to the inside of said support through-hole, the other end part of said rotor is non-turnably received within and adjacent to an engagement hole formed in said connecting plate, thereby the other end part of said rotor is non-turnably received in said support through-hole.

4. A hinge device according to claim 1, wherein said receiving hole is formed in at least one of opposite end faces of said hinge pin, said stator of said damper unit is non-turnably received in said receiving hole, and the other end part of said rotor of said damper unit is non-turnably received in one of said support through-hole and said support hole.

5. A hinge device according to claim 4, wherein said support hole is formed as a through-hole, a connecting plate is detachably fixed to at least one of the insides of said support through-hole and said support hole, and the other end part of said rotor is non-turnably received within and adjacent to an engagement hole formed in said connecting plate, thereby the other end part of said rotor is non-turnably received in one of said support through-hole and said support hole.

6. A hinge device according to claim 5, wherein said receiving hole is formed as a through-hole, an intermediate member is non-turnably disposed at a central part of said receiving hole, said stator is received in one of opposite end parts of said receiving hole, and said stator is non-turnably connected to said intermediate member.

* * * * *